(12) United States Patent
Seto et al.

(10) Patent No.: US 6,875,522 B2
(45) Date of Patent: Apr. 5, 2005

(54) MAGNETIC THIN FILM INTERFERENCE DEVICE OR PIGMENT AND METHOD OF MAKING IT, PRINTING INK OR COATING COMPOSITION, SECURITY DOCUMENT AND USE OF SUCH A MAGNETIC THIN FILM INTERFERENCE DEVICE

(75) Inventors: Myron Seto, Lausanne (CH); Thomas Tiller, Bussigny (CH); Edgar Müller, Fribourg (CH); Claude-Alain Despland, Lausanne (CH)

(73) Assignee: SICPA Holding SA, Prilly (CH)

( * ) Notice: Subject to any disclaimer, the term of this patent is extended or adjusted under 35 U.S.C. 154(b) by 2 days.

(21) Appl. No.: 10/257,969

(22) PCT Filed: Feb. 14, 2002

(86) PCT No.: PCT/EP02/01586

§ 371 (c)(1),
(2), (4) Date: Oct. 28, 2002

(87) PCT Pub. No.: WO02/073250

PCT Pub. Date: Sep. 19, 2002

(65) Prior Publication Data

US 2003/0170471 A1 Sep. 11, 2003

(30) Foreign Application Priority Data

Mar. 9, 2001 (EP) ............................................. 01105952

(51) Int. Cl.⁷ ................................................. B32B 7/04
(52) U.S. Cl. ..................... 428/611; 428/660; 428/669; 428/686; 428/212; 428/409; 428/692; 283/82

(58) Field of Search .................................. 428/686, 611, 428/655, 660, 669, 212, 409, 457, 692, 694 T; 283/82

(56) References Cited

U.S. PATENT DOCUMENTS

| 4,536,444 A | * | 8/1985 | Sumiya et al. .............. 428/340 |
| 4,838,648 A | * | 6/1989 | Phillips et al. .............. 359/585 |
| 5,109,375 A | * | 4/1992 | Greidanus et al. ........ 369/13.35 |
| 5,374,472 A | * | 12/1994 | Krishnan ..................... 428/216 |
| 6,483,741 B1 | * | 11/2002 | Iwasaki et al. ............. 365/170 |
| 2001/0019461 A1 | * | 9/2001 | Allenspach et al. .......... 360/59 |
| 2003/0143400 A1 | * | 7/2003 | Phillips et al. .............. 428/404 |

FOREIGN PATENT DOCUMENTS

WO  WO 99/67093  * 12/1999

* cited by examiner

Primary Examiner—Kevin M. Bernatz
(74) Attorney, Agent, or Firm—Shoemaker and Mattare

(57) ABSTRACT

The invention discloses magnetic OVP, said pigment consisting of thin-layer flakes having a basic metal-dielectric-metal structure to result in a viewing-angle dependent color appearance, and having, in addition to said viewing-angle dependent color appearance, incorporated magnetic properties, to make them distinguishable from OVP of similar appearance but not having said magnetic properties. The invention discloses as well methods for obtaining such pigments and the use of such pigments as security elements in inks, coatings and articles.

21 Claims, 3 Drawing Sheets

MAGNETIC THIN FILM INTERFERENCE DEVICE OR PIGMENT AND METHOD OF MAKING IT, PRINTING INK OR COATING COMPOSITION, SECURITY DOCUMENT AND USE OF SUCH A MAGNETIC THIN FILM INTERFERENCE DEVICE

FIELD OF THE INVENTION

The present invention is in the field of optically variable pigments. In particular, it describes a magnetic thin film interference device, a method of making such a magnetic thin film interference device, a magnetic thin film interference pigment, a printing ink or coating composition, a security document and the use of such a magnetic thin film interference device, all according to the definition of the patent claims.

BACKGROUND OF THE INVENTION

Optically variable devices of various types are used as an efficient anti-copy means on bank notes and security documents. A large part of the world-wide printed currency relies on such optically variable copy protection devices, and among these, features printed with optically variable ink (OVI™) have acquired a preeminent position since their first appearance on currency in 1987.

Optically variable pigment (OVP) shows a viewing-angle dependent color appearance which cannot be reproduced by color copying equipment. Various different types of OVP materials are commercially available today.

Very brilliant colors are obtained with a first type of OVP, made by physical vapor deposition. This type of OVP is constructed as a thin-film vapor-deposited Fabry-Pérot resonator stack. Simple-sandwich metal-dielectric-metal, as well as double-sandwich metal-dielectric-metal-dielectric-metal layer sequences are described in the prior art. The top metal layer(s) must be partially reflecting/partially transparent, such that light can be coupled in and out of the Fabry-Pérot resonator stack.

Said optically variable thin-film material is obtained as a continuous sheet on a carrier foil. It can subsequently be detached from its carrier and comminuted into a pigment, which consists of flakes having a diameter of 20 to 30 $\mu$m and a thickness of about 1 $\mu$m. This pigment can be formulated into inks or coating compositions, preferably for screen-printing or intaglio-printing applications.

The optical variability of said pigments relies on an interference effect. Incident light falling upon an OVP flake of said metal-dielectric-metal type is partially reflected at the top metal layer and partially transmitted, travelling through the dielectric layer and reflected back at the bottom metal layer. Both reflected parts of the incident light finally recombine and interfere with each other. Constructive or destructive interference results, depending on the thickness of the dielectric layer and on the wavelength of the incident light. In the case of white incident light, some of the white light components, having determined wavelengths, are reflected, whereas other components, having other wavelengths, are not reflected. This gives rise to a spectral selection, and hence to the appearance of color.

The path difference between the top-reflected and the bottom-reflected part of the light depends noteworthy on the angle of incidence, and so does the resulting interference color.

Another, second type of OVP, is based on coated aluminum flakes. Mechanically flattened aluminum particles are coated by chemical vapor deposition (CVD) or by wet chemical methods with a dielectric layer and a subsequent metal or second dielectric layer. Interference colors result by the same effect as described above. This type of OVP is cheaper in manufacture than the first type, but it also exhibits less brilliant colors and less angle-dependent color shift than the first type.

Large amounts of "optically variable" and "iridescent" pigment are produced for merely decorative purposes (automotive paints, lacquers, toys and the like), and are thus available to the common public in the form of coating compositions. The security potential of optically variable ink features on bank notes is considerably decreased if no clear distinction can be established between "Security OVP" and "Decorative OVP". A counterfeiter could noteworthy reproduce bank notes on a color copier and add the missing optically variable features with the help of a commercially available decorative paint or spray.

For these and other reasons, security OVP must be made materially distinguishable from the merely decorative, commercially available types of OVP. An effective way of doing this is to dope the security OVP with a covert magnetic feature. The "magnetic OVP" allows noteworthy the implementation of different levels of security into correspondingly marked documents: i) a simple "magnetic present/not present" feature; ii) identification of the magnetic characteristics of the feature; iii) a printed pattern of magnetic and non-magnetic features; and iv) a magnetic data carrier, allowing magnetic storage of information in the printed magnetic OVP feature.

Such magnetic OVP has been proposed in U.S. Pat. No. 4,838,648. A particular magnetic material is, to this purpose, incorporated into the OVP design. The OVP of U.S. Pat. No. 4,838,648 is of the metal(reflector)-dielectric-metal (absorber) multilayer Fabry-Pérot type, and has preferably a magnetic cobalt-nickel 80:20 alloy as the reflector layer. Alternatively, but less preferably, the magnetic alloy may also be present as the absorber layer. The device according to U.S. Pat. No. 4,838,648 has noteworthy the shortcomings of i) showing a degraded optical performance, in particular a lower chromaticity, due to the lower reflectivity of cobalt-nickel alloy, as compared to aluminum, and ii) the lack of freedom for choosing the magnetic material. This latter must noteworthy comply at the same time with the functions of a magnet and of a good optical reflector, and there are only very few materials satisfying both conditions.

It is a first goal of the present invention to provide security OVP which is made materially different from decorative OVP through the incorporation of particular magnetic properties.

It is another goal of the present invention to incorporate said magnetic properties into said OVP without degrading the OVP's chromaticity and color shifting properties.

It is a further goal of the present invention to provide said magnetic OVP with as large as possible freedom for selecting the magnetic material.

It is still another goal of the present invention to provide security OVP which can be manufactured using the same equipment and process that are used for the production of "common", non-magnetic OVP, without significantly increasing the production cost.

SUMMARY OF THE INVENTION

The present invention refers to a magnetic thin film interference device, made of OVP showing a viewing-angle dependent color-appearance. The OVP is made of a multilayer stack including at least one light-reflecting reflector layer, at least one light-transmitting dielectric layer, at least one light-absorbing absorber layer and at least one magnetic layer. The magnetic layer is separated from a dielectric layer by a reflector layer.

According to a first preferred embodiment of a magnetic OVP, the magnetic layer is disposed within two reflector layers. The magnetic layer is symmetrically confined within two reflector layers, resulting in equal optical properties of the magnetic OVP along two reflector layer sides.

According to a second preferred embodiment of a magnetic OVP, the magnetic layer is adjacent to only one reflector layer, resulting in an asymmetrically magnetic OVP with optical properties along solely one reflector layer side.

The magnetic OVP according to the present invention has the particular advantage that it is possible, by using the disclosed layer sequence, to exactly match the color and the angular color shift of a corresponding non-magnetic OVP, and at the same time to provide an OVP with a wide variety of magnetic properties.

The magnetic thin film interference device may be comminuted to obtain a magnetic thin film interference pigment. Said magnetic thin film interference pigment may be incorporated in a printing ink or coating and/or on a security document.

The invention is further illustrated by drawings and examples:

Figure 1:
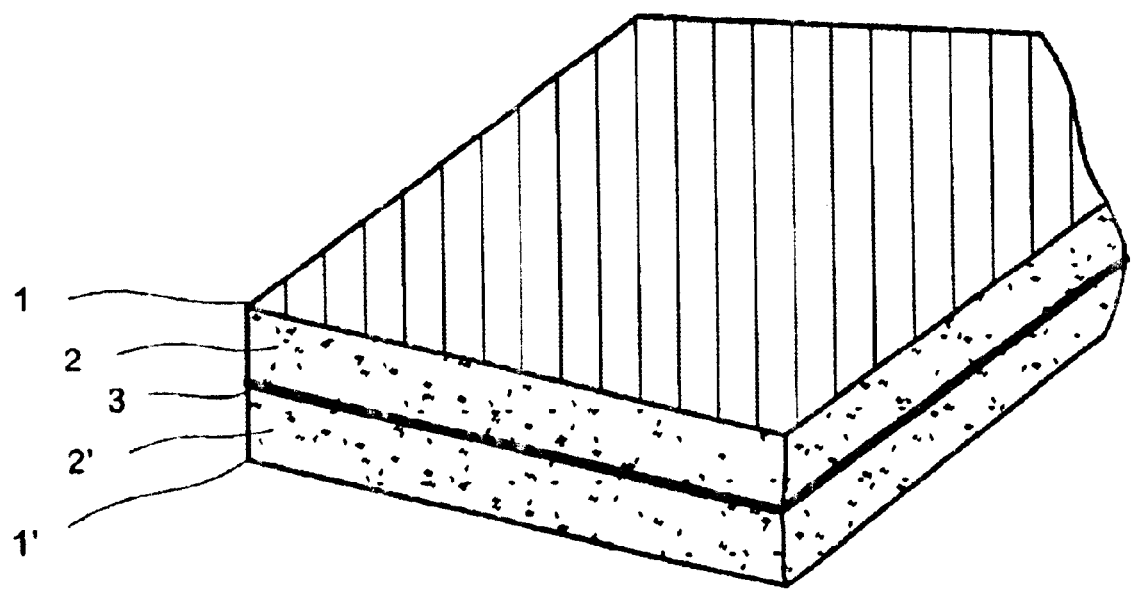
FIG. 1 shows a conventional OVP flake having a 5-layer design.

FIG. 1 shows a cross section of an OVP of the first type described above having a 5-layer design. Such pigment consists of flakes, which are of the order of 20 to 30 $\mu$m large, and about 1 $\mu$m thick. Said flake has a symmetric "absorber/dielectric/reflector/dielectric/absorber" layer structure, in order to provide for equal optical properties on both sides. The absorber layers 1, 1' are preferably thin (e.g. in the order of 3 to 5 nm) chromium or similar corrosion-resistant metal layers, which act as beam-splitters, reflecting and transmitting parts of the incident light. The dielectric layers 2, 2' are preferably of a low dielectric constant material, such as magnesium fluoride ($MgF_2$; n=1.38) or silicon dioxide, to enable a high angle-dependent color shift. The thickness of the dielectric layers 2, 2' determines the OVP's color and is of the order of 200 to 800 nm (e.g. gold-to-green: 440 nm $MgF_2$, green-to-blue: 385 nm $MgF_2$). A central, total light-reflecting reflector layer 3 is preferably of aluminum, or of any other highly reflecting metal or metal alloy, and has a thickness in the order of 10 to 100 nm.

Figure 2:
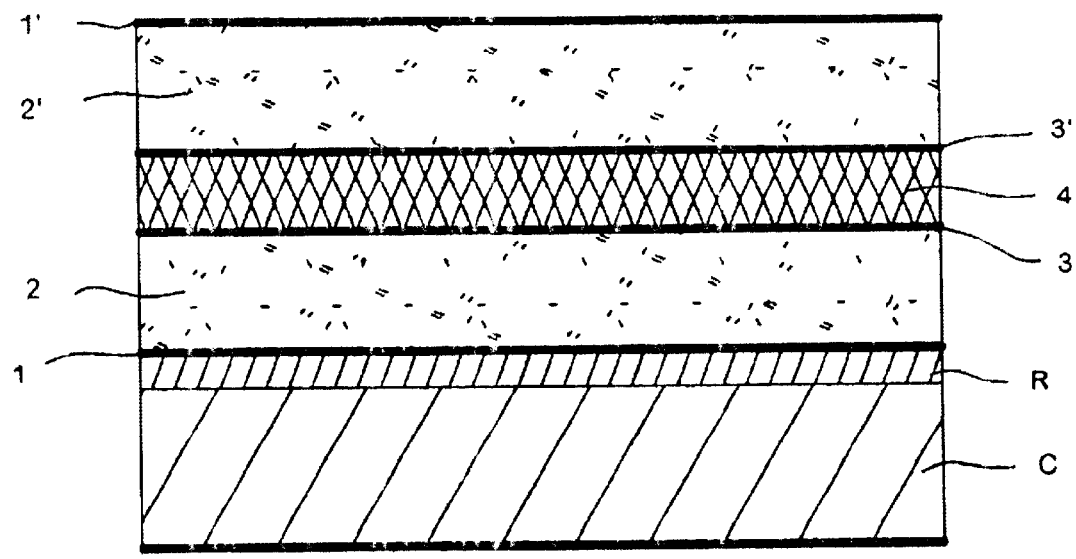
FIG. 2 shows the cross section of a first preferred embodiment of a magnetic OVP according to the invention, having magnetic properties. A 7-layer design is employed.

FIG. 2 shows the schematic layer sequence of a first preferred embodiment of a magnetic OVP according to the present invention. Said magnetic OVP comprises, two absorber layers 1, 1', two dielectric layers 2, 2', and two reflector layers 3, 3'. At least one magnetic layer 4 of magnetic material is disposed within said reflector layers 3, 3', resulting in a symmetric "absorber/dielectric/reflector/magnetic/reflector/dielectric/absorber" of a 7-layer design.

Figure 3:
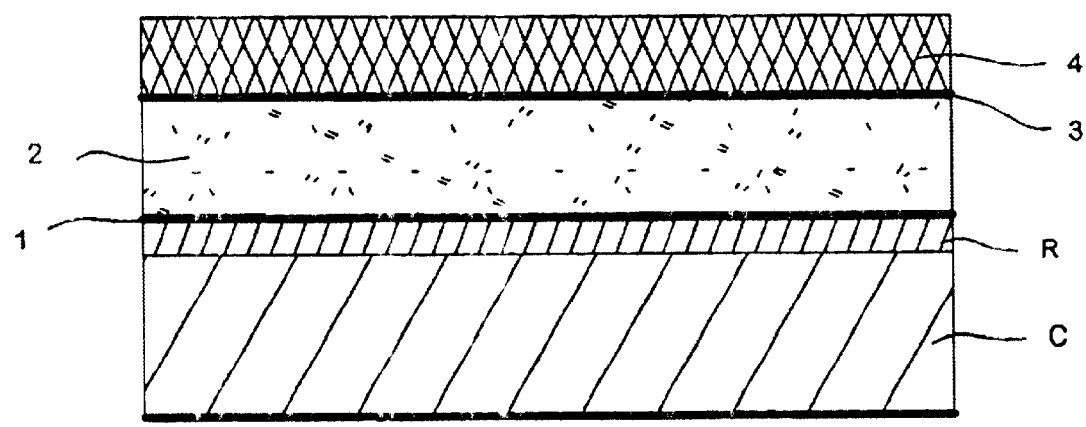
FIG. 3 shows the cross section of a second preferred embodiment of a magnetic OVP according to the invention, having magnetic properties. A 4-layer design is employed.

FIG. 3, shows the schematic layer sequence of a second preferred embodiment of a magnetic OVP according to the present invention. Said magnetic OVP comprises one absorber layer 1, one dielectric layer 2 and at least one magnetic layer 4 being adjacent to one reflector layer 4. In this embodiment, a 4-layer design is required. Preferably, on a release-coated R carrier foil C, an absorber layer 1 of chromium is deposited, followed by a dielectric layer 2 of magnesium fluoride and a reflector layer 3 of aluminum. A magnetic layer 4 of magnetic material is deposited at last. The device is subsequently applied to a substrate with the magnetic layer facing the substrate, by e.g. using an appropriate glue.

The magnetic layer 4 can be of any type of magnetic material, e.g. iron, cobalt, nickel; magnetic alloys such as Ni—Co or Nd—Fe—B; inorganic oxide compounds such as $Fe_2O_3$, $Fe_3O_4$, chromium dioxide $CrO_2$, ferrites $MFe_2O_4$ (with M an ion or a cocktail of ions selected from the group consisting of $Mg^{2+}$, $Ca^{2+}$, $Sr^{2+}$, $Ba^{2+}$, $Mn^{2+}$, $Co^{2+}$, $Fe^{2+}$, $Ni^{2+}$, $Cu^{2+}$, $Zn^{2+}$, etc.), garnets $A_3B_5O_{12}$ (with A=a trivalent rare earth-ion or a cocktail of trivalent rare-earth ions and B an ion or a cocktail of ions selected from the group consisting of $Al^{3+}$, $Cr^{3+}$, $Fe^{3+}$, $Ga^{3+}$, $Bi^{3+}$etc.), hexaferrites $MFe_{12}O_{19}$ with M selected from the group of divalent ions $Ca^{2+}$, $Sr^{2+}$, $Ba^{2+}$, etc., perovskites, etc.

In the context of the present invention, any kind of not-diamagnetic material may noteworthy be used to confer a particular magnetic property to the magnetic OVP. Said magnetic property may for instance be: strong (super-) paramagnetism; ferromagnetism; ferrimagnetism; antiferromagnetism; antiferrimagnetism; etc. The material may be of the soft-magnetic, low-coercivity, medium-coercivity or hard-magnetic type, or it may be laid out for detection by the Barkhausen effect. The magnetic property may furthermore result in remanent magnetism comprised in between zero Oersted up to as high as 10,000 Oersted.

The deposition of the magnetic material is performed by the same method as used for the deposition of the dielectric layer or of the metal layers of a nonmagnetic OVP of the first type mentioned above. $MgF_2$, chromium or aluminum can noteworthy be deposited by electron-beam assisted thermal evaporation. Magnetic alloys, such as cobalt-nickel or iron-cobalt-boron, are comparable in melting point and evaporation characteristics with chromium, and can therefore be deposited in a similar way, given the deposition is performed at source temperatures above the material's Curie or Neel temperature. For the deposition of oxide materials, higher deposition temperatures are generally required, but even these materials can be deposited by e-beam techniques. For the deposition of more complex chemical compositions, ion-beam assisted evaporation methods may be employed.

The magnetic layer 4 is covered by a reflector layer 3, 3' made of a good light reflecting material, such as aluminum, aluminum alloy, chromium, silver, gold, etc. This allows the magnetic OVP to be optimized simultaneously for good optical performance as well as for customer-designed magnetic properties. In this way, different varieties of security-OVP can be produced, all having exactly the same color appearance and color shifting properties, but different magnetic properties. Using a corresponding magnetic detecting device, known to the skilled in the art, they can easily be distinguished from each other, as well as from non-magnetic OVP of the same optical appearance.

It is furthermore possible to use the primarily obtained optically variable and magnetic thin-film product directly as an optically variable security foil, which may be applied to a document or to an article, preferably by hot-stamping or cold-stamping or related application methods.

A further property which can advantageously be exploited for security purposes is the particular form of the magnetization or hysteresis curve of thin-film magnetic materials. Due to their restricted third dimension, such materials often show a very high squareness of their hysteresis curve, together with a variable coercivity value which depends noteworthy on the layer thickness and on the parameters used in the deposition of the magnetic layer. Such materials may also be laid out to show a pronounced Barkhausen effect, which enables their detection by techniques known from electronic article surveillance (EAS) applications. Alternatively, nonlinear magnetization effects may be exploited for detection, through the choice of the appropriate magnetic materials, such as amorphous magnetic alloys or magnetic garnets of low magnetic saturation. A wide field is thus open for the engineering of OVP showing magnetic effects and properties, which are very difficult to counterfeit on the mere basis of mixing conventional OVP with conventional magnetic materials.

Said 7-layer magnetic OVP respectively 4-layer magnetic OVP can noteworthy be manufactured using the same type of vacuum-deposition equipment as is required for the manufacturing of the conventional 5-layer non-magnetic OVP.

More than one layer of magnetic material may be present in the magnetic OVP. In case of multiple layers of magnetic material, said layers may be either of the same or of different magnetic materials; said layers of magnetic material may furthermore be either adjacent to each other or separated from each other by layers of non-magnetic materials. Said magnetic layer 4 may be multi-layer stacks, preferably layered superlattices. Layered superlattices have been shown to display unusual electromagnetic effects, such as Giant Magnetoresistance, non-linear high-frequency response, unusual nuclear magnetic resonance signatures, etc.

The magnetic OVP according to the invention may furthermore carry additional overt or covert properties, such as indicia, micro-texture, luminescence, radio-frequency or microwave resonance absorption, etc.

EXAMPLES

In the first preferred embodiment of a magnetic OVP, depicted in FIG. 2, the magnetic layer 4 is comprised within two totally reflector layers 3, 3' of the OVP stack. In order to provide for optimal conditions of both, the optical and the magnetic function, the "standard" OVP layer sequence chromium/magnesium fluoride/aluminum is used to implement the optical function. The aluminum layer is "split in two", in order to accommodate the magnetic functionality in its interior in the form of an additional layer of any desired magnetic element, alloy or compound.

On a release-coated R carrier foil C, a first absorber layer 1 of chromium is deposited, followed by a first dielectric layer 2 of magnesium fluoride and a first reflector layer 3 of aluminum. Then, the magnetic layer 4 of magnetic material is deposited, followed by a second reflector layer 3' of aluminum. A second dielectric layer 2' of magnesium fluoride and a second absorber layer 1' of chromium are then deposited, to finish the magnetic OVP multi-layer stack.

The skilled in the art will notice that any type of magnetic material, amorphous or crystalline, such as a magnetic metal like iron, cobalt, nickel, etc.; or a magnetic alloy, such as cobalt-nickel, cobalt-chromium, terbium-iron, neodymium-iron-boron etc.; or a magnetic refractory compound, such as a simple or a complex oxide from the classes of ferrites, hexaferrites, garnets, perovskites etc. can be used as the middle magnetic layer between two aluminum reflector layers.

1. Soft Magnetic Green-to-Blue OVP

In a first preferred embodiment of a magnetic OVP, soft magnetic iron was used as the magnetic function carrier. A 7-layer sequence was deposited by electron beam assisted thermal evaporation onto a release-coated R carrier foil C as follows:

1. Chromium metal, 3.5 nm thick (first absorber layer 1)
2. $MgF_2$, 385 nm thick (first dielectric layer 2)
3. Aluminum metal, 40 nm thick (first reflector layer 3)
4. Iron metal, 200 nm thick (magnetic layer 4)
5. Aluminum metal, 40 nm thick (second reflector layer 3')
6. $MgF_2$, 385 nm thick (second dielectric layer 2')
7. Chromium metal, 3.5 nm thick (second absorber layer 1')

Total optical path at orthogonal incidence: 530 nm.

After the deposition being completed, the thin film product was removed from the carrier foil C, comminuted to a pigment, and used in inks and coating compositions.

In a variant of the first preferred embodiment of a magnetic OVP, magnetic layer 4 was made of nickel metal, to yield a low-coercivity optically variable pigment.

In a further variant of the first preferred embodiment of a magnetic OVP, magnetic layer 4 was made of cobalt metal, to yield a medium-coercivity optically variable pigment, which is furthermore susceptible to detection by cobalt-59 nuclear magnetic resonance in its own magnetic field, in the 214 MHz region.

In still a further variant of the first preferred embodiment of a magnetic OVP, magnetic layer 4 was made of gadolinium metal, to yield optically variable pigment which is ferromagnetic below 16° C., the Curie temperature of gadolinium metal.

2. Low-Coercivity Gold-to-Green OVP

In another variant of the first preferred embodiment of a magnetic OVP, a low-coercivity, amorphous, Barkhausen-active EAS material of the composition $Fe_{50}Co_{25}Si_{10}B_{15}$ was used as the magnetic function carrier. A 7-layer sequence was deposited by electron-beam assisted thermal evaporation onto a release-coated R carrier foil C as follows:

1. Chromium metal, 3.5 nm thick (first absorber layer 1)
2. $MgF_2$, 440 nm thick (first dielectric layer 2)
3. Aluminum metal, 40 nm thick first reflector layer 3)
4. $Fe_{50}Co_{25}Si_{10}B_{15}$, 500 nm thick (magnetic layer 4)
5. Aluminum metal, 40 nm thick (second reflector layer 3')
6. $MgF_2$, 440 nm thick (second dielectric layer 2')
7. Chromium metal, 3.5 nm thick (second absorber layer 1')

Total optical path at orthogonal incidence: 605 nm.

The complex amorphous $Fe_{50}Co_{25}Si_{10}B_{15}$ alloy can also advantageously be deposited by argon ion-beam assisted thermal evaporation.

After the deposition being completed, the thin film product was removed from the carrier, comminuted to a pigment, and used in inks and coating compositions.

This material shows a sharp Barkhausen discontinuity on magnetization change in the magnetic field range below 1 Oersted.

3. Medium Coercivity Green-to-Blue OVP

In another variant of the first preferred embodiment of a magnetic OVP, a medium-coercivity cobalt ferrite of the composition $CoFe_2O_4$ was used as the magnetic function carrier. A 7-layer sequence was deposited by electron-beam assisted thermal evaporation onto a release-coated (R) carrier foil (C) as follows:

1. Chromium metal, 3.5 nm thick (first absorber layer 1)
2. $MgF_2$, 385 nm thick (first dielectric layer 2)
3. Aluminum metal, 40 nm thick (first reflector layer 3)
4. $CoFe_2O_4$, 100 nm thick (magnetic layer 4)
5. Aluminum metal, 40 nm thick (second reflection layer 3')
6. $MgF_2$, 385 nm thick (second dielectric layer 2')
7. Chromium metal, 3.5 nm thick (second absorber layer 1')

Total optical path at orthogonal incidence: 530 nm.

The $CoFe_2O_4$ ferrite material can also advantageously be deposited by argon ion-beam assisted thermal evaporation.

After the deposition being completed, the thin film product was removed from the carrier, comminuted to a pigment, and used in inks and coating compositions.

An optically variable patch containing magnetic OVP manufactured according to this embodiment was successfully used as a track for the magnetic storage of security information, such as the hidden cross-checking information in transportation tickets, bank cards, credit or access cards.

4. High Coercivity Green-to-Blue OVP

In another variant of the first preferred embodiment of a magnetic OVP, a high-coercivity, barium ferrite material of the composition $BaFe_{12}O_{19}$ was used as the magnetic function carrier. A 7-layer sequence was deposited by electron-beam assisted thermal evaporation onto a release-coated R carrier foil C as follows:

1. Chromium metal, 3.5 nm thick (first absorber layer 1)
2. $MgF_2$, 385 nm thick (first dielectric layer 2)
3. Aluminum metal, 40 nm thick (first reflector layer 3)
4. $BaFe_{12}O_{19}$, 300 nm thick (magnetic layer 4)
5. Aluminum metal, 40 nm thick (second reflector layer 3')
6. $MgF_2$, 385 nm thick (second dielectric layer 2')
7. Chromium metal, 3.5 nm thick (second absorber layer 1')

Total optical path at orthogonal incidence: 530 nm.

The $BaFe_{12}O_{19}$ ferrite material can also advantageously be deposited by argon ion-beam assisted thermal evaporation.

After the deposition being completed, the thin film product was removed from the carrier, comminuted to a pigment, and used in inks and coating compositions.

An optically variable patch containing magnetic OVP manufactured according to this variant of the preferred embodiment was successfully used as a track for irreversibly written magnetic security information, e.g. hidden authenticating information in a credit or access card. A special, not commonly available hardware was required to magnetize the 3000 Oersted coercivity barium ferrite material, in order to write said security information.

The OVP according to the foregoing embodiments can be incorporated into inks or coating compositions and applied to articles by any printing or coating method, such as intaglio, silk screen or transfer printing; alternatively they can be molded or laminated into plastic material.

The present invention also discloses optically variable foils having magnetic properties, which constructed according to the same principles as said optically variable pigments. Such foils noteworthy comprise an at least 4-layer stack, comprising an optical part and at least one additional magnetic layer on top of it.

More than one magnetic layer 4 of magnetic material may be present in the optically variable foil. In case of multiple magnetic layers 4, said layers may be adjacent to each other or separated by layers of non-magnetic material. The magnetic layers 4 may furthermore be either of the same, or of different magnetic materials. The optically variable foil according to the invention may furthermore carry additional overt or covert properties, such as indicia, micro-texture, luminescence, radio-frequency or microwave resonance, etc.

The magnetic layer side of the foil will be applied onto a substrate, using an appropriate transfer technique, such as hot- or cold-stamping, in conjunction with an appropriate glue.

5. Medium-Coercivity Gold-to-Green OVP Foil

In a second preferred embodiment of a magnetic OVP, a medium-coercivity iron oxide is used as the magnetic function carrier in an OVP foil. A 4-layer sequence was deposited by electron-beam assisted thermal evaporation onto a release-coated R carrier foil C as follows:

1. Chromium metal, 3.5 nm thick (absorber layer 1)
2. $MgF_2$, 440 nm thick (dielectric layer 2)
3. Aluminum metal, 40 nm thick (reflector layer 3)
4. $Fe_2O_3$, 500 nm thick (magnetic layer 4)

Total optical path at orthogonal incidence: 605 nm.

The $Fe_2O_3$ material can also advantageously be deposited by argon ion-beam assisted thermal evaporation.

After the deposition being completed, the foil was coated with a hot-melt glue composition and applied to security documents using a hot-stamping die of elongated form, to form an optically variable magnetic track. Authentication information was then magnetically written into said security track.

6. Activatable-Deactivatable EAS Green-to-Blue OVP Foil

In a variant of the second preferred embodiment of a magnetic OVP, a multilayer magnetic material was used as the magnetic function carrier. The device consists of a Barkhausen-active EAS layer of $Fe_{60}Co_{15}Si_{10}B_{15}$, followed by a low-coercivity nickel layer. The following sequence was deposited by electron beam assisted thermal evaporation onto a release-coated R carrier foil C, as follows:

1. Chromium metal, 3.5 nm thick (absorber layer 1)
2. $MgF_2$, 385 nm thick (dielectric layer 2)
3. Aluminum metal, 40 nm thick (reflector layer 3)
4. $Fe_{60}Co_{15}Si_{10}B_{15}$, 200 nm thick (first magnetic layer 4)
5. Nickel metal, 200 nm thick (second magnetic layer 4)

Total optical path at orthogonal incidence: 530 nm.

The $Fe_{60}Co_{15}Si_{10}B_{15}$ material can also advantageously be deposited by argon ion-beam assisted thermal evaporation.

After the deposition being completed, the foil was applied to security documents using a pre-printed, UV-activated glue patch and a cold-stamping die in the form of optically variable magnetic security seals.

If the nickel layer is in a magnetized state, the $Fe_{60}Co_{15}Si_{10}B_{15}$ layer will not respond to the Barkhausen interrogating field, which is an alternating magnetic field having a maximum field strength below 5 Oersted. At the end of a demagnetization cycle, however, the Barkhausen-active material can be detected through its characteristic response. It is then protected again by a remagnetization of the nickel layer.

What is claimed is:

1. A magnetic thin film interference device showing a viewing-angle dependent color-appearance, said device comprising a multi-layer stack including at least one first light-reflecting reflector layer, at least one light-transmitting dielectric layer, at least one light-absorbing layer and at least one magnetic layer directly adjacent to said first reflecting layer, wherein said magnetic layer is separated from said dielectric layer by said first reflector layer.

2. A magnetic thin film interference device according to claim 1, wherein a second reflector layer is disposed on the opposite side of said magnetic layer from said first reflector layer.

3. A magnetic thin film interference device according to claim 1, wherein said magnetic layer is of a magnetic metal or a magnetic metal alloy comprising a chemical element selected from the group consisting of iron, cobalt, nickel and gadolinium, and mixtures thereof.

4. A magnetic thin film interference device according to claim 1, wherein said magnetic layer is an inorganic oxide compound.

5. A magnetic thin film interference device according to claim 1, wherein said magnetic layer is a ferrite of the formula $MFe_2O_4$ where M is a doubly charged ion of an element selected from the group consisting of Mg, Mn, CO, Fe, Ni, CU and Zn.

6. A magnetic thin film interference device according to claim 1, wherein said magnetic layer is a garnet of the formula $A_3B_3O_{12}$, where A is a triply charged ion of an element selected from the group consisting of Y, La, Ce, Pr, ND, Sm, Eu, Gd, Tb, Dy, Ho, Er, Tm, Yb, Lu and Bi, and mixtures thereof, and B is a triply charged ion of an element selected from the group consisting of Fe, Al, Ga, Ti, V, Cr, Mn and Co, and mixtures thereof.

7. A magnetic thin film interference device according to claim 1, wherein said reflector layer is selected from the group consisting of aluminum, aluminum alloys, chromium, nickel, silver and gold.

8. A magnetic thin film interference device according to claim 1, wherein said magnetic layer is a magnetic multi-layer stack.

9. A magnetic thin film interference device according to claim 8, wherein said magnetic multi-layer stack is a layered superlattice.

10. A magnetic thin film interference device according to claim 8, wherein said multi-layer stack contains at least two different materials, at least one of which is magnetic.

11. A magnetic thin-film interference pigment, obtained by comminuting the magnetic thin film interference device of claim 1.

12. A printing ink or coating composition containing magnetic thin film interference pigment according to claim 1.

13. A security document comprising a magnetic thin film interference device of claim 1, wherein the magnetic thin film interference device is applied onto a substrate by a printing technique, by a coating technique, or by a transfer technique.

14. A security document according to claim 13, wherein said transfer technique is hot-stamping or cold-stamping.

15. A method of using a thin film interference device according to claim 1 for authenticating an item, said method comprising a step of authenticating optical interference properties and magnetic properties of said thin film interference device.

16. A method according to claim 15, wherein the interference device is part of a coating composition or a coating.

17. A method for producing a magnetic thin-film interference device, made of optically variable pigments showing a viewing-angle dependent color-appearance, comprising a multi-layer stack including at least one first light-reflecting reflector layer, at least one light-transmitting dielectric layer, at least one light-absorbing absorber layer, and at least one magnetic layer, comprising the steps of:

a) depositing a dielectric layer on one side of an absorber layer, b) depositing a reflector layer on said dielectric layer and, c) directly depositing a magnetic layer on said first reflector layer.

18. A method for producing a magnetic thin-film interference device according to claim 17, further comprising steps of:

d) depositing a second reflector layer on said magnetic layer, e) depositing a second dielectric layer on said reflector layer, and f) depositing a second absorber layer on said second dielectric layer.

19. A method of using a thin film interference device according to claim 11 for authenticating an item, said method comprising a step of authenticating optical interference properties and magnetic properties of said thin film interference device.

20. A method according to claim 19, wherein the interference device is part of a coating composition or a coating.

21. A method for producing a magnetic thin-film interference device as claimed in claim 1, said method comprising the steps of depositing a dielectric layer on one side of an absorber layer, depositing a reflector layer on said dielectric layer and depositing a magnetic layer on said reflector layer.

* * * * *